US012634587B2

(12) United States Patent
Pan et al.

(10) Patent No.: US 12,634,587 B2
(45) Date of Patent: May 19, 2026

(54) EVENT-BASED AUTO-EXPOSURE FOR DIGITAL PHOTOGRAPHY

(71) Applicant: The University of Hong Kong, Hong Kong (CN)

(72) Inventors: Jia Pan, Hong Kong (CN); Shijie Lin, Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 185 days.

(21) Appl. No.: 18/682,422

(22) PCT Filed: Aug. 24, 2022

(86) PCT No.: PCT/CN2022/114456
§ 371 (c)(1),
(2) Date: Feb. 8, 2024

(87) PCT Pub. No.: WO2023/025185
PCT Pub. Date: Mar. 2, 2023

(65) Prior Publication Data

US 2024/0348934 A1 Oct. 17, 2024

Related U.S. Application Data

(60) Provisional application No. 63/236,375, filed on Aug. 24, 2021.

(51) Int. Cl.
*H04N 23/73* (2023.01)
*H04N 23/71* (2023.01)
(Continued)

(52) U.S. Cl.
CPC ............ *H04N 23/73* (2023.01); *H04N 23/71* (2023.01); *H04N 23/72* (2023.01); *H04N 23/74* (2023.01); *H04N 25/47* (2023.01)

(58) Field of Classification Search
None
See application file for complete search history.

(56) References Cited

U.S. PATENT DOCUMENTS 4,423,936 A 1/1984 Johnson
5,592,256 A 1/1997 Muramatsu
(Continued)

FOREIGN PATENT DOCUMENTS

CN 112801027 A 5/2021

OTHER PUBLICATIONS

Davis 346 event camera, Aug. 15, 2019 (Year: 2019).*
(Continued)

*Primary Examiner* — James M Hannett
(74) *Attorney, Agent, or Firm* — Leason Ellis LLP

(57) ABSTRACT

An event-guided auto-exposure (EG-AE) device leverages the high dynamic range and low latency properties of a dynamic vision sensor to guide the exposure setting of an active pixel sensor. The method utilizes physical connections of images and events to estimate the irradiance variations, which are fed into the EG-AE device for calculating the exposure setting. The method shows outstanding performance in tackling highly challenging lighting conditions and benefits multiple downstream applications, including visual tag detection and feature matching.

9 Claims, 5 Drawing Sheets
(5 of 5 Drawing Sheet(s) Filed in Color)

(51) Int. Cl.

| | |
|---|---|
| ***H04N 23/72*** | (2023.01) |
| ***H04N 23/74*** | (2023.01) |
| ***H04N 25/47*** | (2023.01) |

(56) References Cited

U.S. PATENT DOCUMENTS

| | | | | |
|---|---|---|---|---|
| 11,768,919 | B2 * | 9/2023 | Ryan | G06V 20/597 382/181 |
| 2008/0226192 | A1 * | 9/2008 | Silverstein | H04N 23/73 348/E5.037 |
| 2018/0176442 | A1 * | 6/2018 | Okada | H04N 23/951 |
| 2020/0226377 | A1 | 7/2020 | Macias et al. | |
| 2020/0342607 | A1 * | 10/2020 | Hoshino | H04N 23/667 |
| 2023/0232112 | A1 * | 7/2023 | Nishio | H04N 25/78 348/208.1 |
| 2023/0297158 | A1 * | 9/2023 | Zha | H04N 25/47 |
| 2024/0259702 | A1 * | 8/2024 | Moeys | H04N 23/60 |

OTHER PUBLICATIONS

Attridge, et al. "The Manual of Photography." Focal press, 1988, 46 pages.

Bay, et al. "SURF: Speeded-up Robust Features," Computer Vision and Image Understanding, 2008, vol. 110, Issue 3, 14 pages.

Brandli, et al. Real-Time, High-Speed Video Decompression Using a Frame- and Event-Based DAVIS Sensor, IEEE International Symposium on Circuits and Systems (ISCAS), 2014, pp. 686-689.

Brandli, et al. "A 240 180 130 dB 3 is latency global shutter spatiotemporal vision sensor," IEEE Journal of Solid-State Circuits, 2014, vol. 49, No. 10, pp. 2333-2341.

Chen, et al. "Fast retinomorphic event-driven representations for video gameplay and action recognition," IEEE Transactions on Computational Imaging, 2019, 6: 14 pages.

Debevec, et al. "Recovering high dynamic range radiance maps from photographs." Proceeding SIGGRAPH'08 ACM SIGGRAPH, 2008 classes Article 31 (2008), 10 pages.

Delbruck, et al. "32-bit Configurable Bias Current Generator with sub-off-current capability." Proceedings of 2010 IEEE International Symposium on Circuits and Systems. IEEE, 2010, pp. 1647-1650.

Gehrig, et al. "EKLT: Asynchronous photometric feature tracking using events and frames." International Journal of Computer Vision 128.3, 2020, pp. 601-618.

Gehrig, et al. "End-to-end learning of representations for asynchronous event-based data." Proceedings of the IEEE/CVF International Conference on Computer Vision. 2019. pages.

GoPro hero, Official Camera of Fun, May 17, 2024, 7 pages, https://gopro.com/en/us. 7, 8.

Grossberg, et al. "Modeling the space of camera response functions." IEEE transactions on pattern analysis and machine intelligence Oct. 26, 2004, pp. 1272-1282.

Harris, et al. "A combined corner and edge detector." In Proc. 4th Alvey Vision Conference, Manchester, U.K., Aug. 1988, pp. 147-151.

Hu et al. "v2e: From video frames to realistic DVS events." Proceedings of the IEEE/CVF conference on computer vision and pattern recognition, 2021, 10 pages.

Huawei mate 30. May 1, 2024, 8 pages https://consumer.huawei.com/ en/phones/mate30/. 7, 8.

Kim, et al, "Younggun Cho, and Ayoung Kim. Exposure control using bayesian optimization based on entropy weighted image gradient." In 2018 IEEE International Conference on Robotics and Automation (ICRA), 2018, pp. 857-864.

Kremens, et al. "System implications of implementing auto-exposure on consumer digital cameras." Sensors, Cameras, and Applications for Digital Photography, SPIE, 1999, 9 pages.

Kuno, et al, "A new automatic exposure system for digital still cameras." IEEE Transactions on Consumer Electronics 44.1, 1998, pp. 192-199.

Leutenegger, et al, "BRISK: Binary robust invariant scalable keypoints." 2011 International conference on computer vision. IEEE, 2011, pp. 2548-2555.

Lin, et al, "Efficient spatial-temporal normalization of sae representation for event camera." IEEE Robotics and Automation Letters 5.3, 2020, pp. 4265-4272.

Liu, et al, "No-reference image quality assessment based on spatial and spectral entropies." Signal processing: Image communication 29.8, 2014, pp. 856-863.

Liu, et al. "Deep learning for generic object detection: A survey." International journal of computer vision 128, 2019, 35 pages.

Lu, et al. "Camera parameters auto-adjusting technique for robust robot vision." 2010 IEEE International Conference on Robotics and Automation, 2010, 6 pages.

Matas, et al. "Robust wide-baseline stereo from maximally stable extremal regions." Image and vision computing 22.10 (2004): 761-767.

Meiguang, et al, "Learning to extract a video sequence from a single motion-blurred image." Proceedings of the IEEE Conference on Computer Vision and Pattern Recognition, 2018, pp. 6334-6342.

Mittal, et al. "No-reference image quality assessment in the spatial domain." IEEE Transactions on image processing, Dec. 2012, vol. 21, No. 12, pp. 4695-4708.

Montalvo, et al. "Acquisition of agronomic images with sufficient quality by automatic exposure time control and histogram matching." Advanced Concepts for Intelligent Vision Systems: 15th International Conference, ACIVS 2013, INCS 8192, 2013, Springer International Publishing, pp. 37-48 DOI: 10.1007/ 978-3-319-02895-8 64.

Neves, et al. "Autonomous configuration of parameters in robotic digital cameras." Pattern Recognition and Image Analysis: 4th Iberian Conference, 2009, IbPRIA 2009, LNCS 5524, pp. 80-87.

Nouourani-Vatani, et al. "Automatic camera exposure control." Proceedings of the Australasian Conference on Robotics and Automation 2007. Australian Robotics and Automation Association (ARAA), 7 pages.

Nozaki, et al. "Temperature and parasitic photocurrent effects in dynamic vision sensors." IEEE Transactions on Electron Devices, 2017, 7 pages.

Olson, "AprilTag: A robust and flexible visual fiducial system." 2011 IEEE international conference on robotics and automation. IEEE, May 9-13, 2011, pp. 3400-3407.

"Pan, et al. "Bringing a blurry frame alive at high frame-rate with an event camera."" Proceedings of the IEEE/CVF conference on computer vision and pattern recognition, 14 pages arXiv:1811.10180v2 [cs.CV] Nov. 27, 2018.

Pan, et al. "Deblurring images via dark channel prior." IEEE transactions on pattern analysis and machine intelligence, 2017, vol. 40., No. 10, pp. 2315-2328.

Rosten, et al. "Fusing points and lines for high performance tracking." Tenth IEEE International Conference on Computer Vision (ICCV'05), 2005, 8 pages.

Shim, et al. "Auto-adjusting camera exposure for outdoor robotics using gradient information." IEEE, 2014, 7 pages arXiv:1708.07338v2 [cs.CV] Oct. 10, 2017.

Shim, et al. "Gradient-based camera exposure control for outdoor mobile platforms." IEEE Transactions on Circuits and Systems for Video Technology, 2018, 14 pages arXiv:1708.07338v3 [cs.CV] Jun. 13, 2018.

Venkatanath, et al. "Blind image quality evaluation using perception based features." IEEE, 2015, 6 pages.

Vidal, et al. "Ultimate SLAM? Combining events, images, and IMU for robust visual SLAM in HDR and high-speed scenarios." IEEE Robotics and Automation Letters, Dec. 2017, 10 pages.

Wang, et al. "Event camera calibration of per-pixel biased contrast threshold." 11 pages arXiv:2012.09378v1 [cs.CV] Dec. 17, 2020.

Wang, et al. "Event-based high dynamic range image and very high frame rate video generation using conditional generative adversarial networks." Proceedings of the IEEE/CVF Conference on Computer Vision and Pattern Recognition, 2019, pp. 10081-10090.

(56) References Cited

OTHER PUBLICATIONS

Wang, et al. "Joint filtering of intensity images and neuromorphic events for high-resolution noise-robust imaging." Proceedings of the IEEE/CVF Conference on Computer Vision and Pattern Recognition, 2020, pp. 1609-1619.
"ZHANG, et al. ""Active exposure control for robust visual odometry in HDR environments."" 2017 IEEE international conference on robotics and automation (ICRA)." IEEE, 2017, 9 pages.
International Search Report and Written Opinion of corresponding International Application No. PCT/CN2022/114456 mailed Nov. 22, 2022. 5 pages.
Delbruck "SensorsINI/jaer: Java tools for Address-Event Representation (AER) neuromorphic vision and audio sensor processing" Github, 2024, 7 pages.

* cited by examiner (a) Detection in a saturated image (b) Detection in a clear image (c) Comparisons between conventional AE and proposed EG-AE (a) Blur (b) Fixed steps (c) Non-uniform (a) Events (b) Images (c) [illegible]

(d) [illegible]

(e) [illegible]

(f) Ours (Image)

(g) Ours (Irradiance)

(a) ME vs. Our EG-AE (b) DAVIS 346 AE [illegible] vs. Our EG-AE (c) I-AE [illegible] vs. Our EG-AE (a) ME *vs.* Our EG-AE (b) DAVIS 346 AE [5] *vs.* Our EG-AE (c) I-AE [38] *vs.* Our EG-AE (a) DAVIS 346 AE [5]: > 11 images over exposed (b) GoPro HERO 7 AE [1]: > 9 images over exposed (c) HUAWEI Mate 30 AE [2]: > 5 images over exposed (d) Our EG-AE: 0 image over exposed (a) Blur (b) Result 1

(c) Result 2

(a) DAVIS AE [5]

(b) Our EG-AE (c) EG-AE + E-IE (d) SURF feature matching between image $j$ and image $j+1$

EVENT-BASED AUTO-EXPOSURE FOR DIGITAL PHOTOGRAPHY

CROSS-REFERENCE TO RELATED PATENT APPLICATIONS

This application is a U.S. National Stage Application under 35 U.S.C. § 371 of International Patent Application No. PCT/CN2022/114456, filed Aug. 24, 2022, and claims the benefit of priority under 35 U.S.C. Section 119(e) of U.S. Application No. 63/236,375, filed Aug. 24, 2021, all of which are incorporated herein by reference in their entireties. The International Application was published on Mar. 2, 2023 as International Publication No. WO 2023/025185 A1.

TECHNICAL FIELD

The present application relates to exposure control for digital cameras, and more particularly to event-guided auto-exposure control.

BACKGROUND

Exposure control (EC) is essential for digital photography [17] in order to capture images or video frames with appropriate dynamic range for high-quality visualization [30] or reliable vision-based applications, including object detection and tracking [24], simultaneous localization and mapping (SLAM) [44], recognition [23] and robotics [29]. Without EC, images can be saturated, which affects the detection algorithm. See FIG. 1A. A proper EC alleviates such saturation and helps the detection algorithm work well as shown in FIG. 1B.

Auto-exposure (AE) facilitates EC by adjusting the exposure parameters with a sophisticated feedback controller [29, 30, 44]. Correspondingly, the optimal exposure level is determined either according to an irradiance prediction [29, 30] or by leveraging the image assessment [18, 38, 44]. Both require well-exposed images, which may not be provided under nature scenes, especially with harsh lighting conditions or unpredictable relative motions, resulting in a large number of failed trials for the auto-exposure control [38]. In summary, two challenging issues are:

- Harsh lighting conditions: The low dynamic range (<60 dB) and high latency (>33 ms for 30 FPS cameras) of active pixel sensors (APS) generally require multiple image samples for current AE methods to converge to a stable exposure setting. Harsh lighting conditions can randomly disturb the stable point and destabilize the AE methods, resulting in heavily saturated images.
- Unpredictable relative motions: Unpredictable relative motions between the APS and scenes generate motion blur in images, making it difficult for current AE methods to extract useful information for exposure adjustment.

Using a combination of events and image frames for exposure control has become a popular area of research in recent years. The majority of the previous work in this area [7,40,41] directly uses event representation methods, such as time surface [21] or event stacking [11], to generate event frames and then combines them with image frames. In recent years, researchers have become interested in using optimization frameworks to combine two modalities [34, 43]. Wang et al. [43] used the motion compensation framework to filter the events in combination with a high frame rate image. Pan et al. [34] used an integral model to describe the latent image and then completed the deblurring and frame reconstruction. However, this work did not consider the complete image formation process. It assumes a linear camera radiometric response, which hardly converges to the optimal setting when facing a non-linear one. Besides, it can generate a correct contrast image but cannot directly estimate the irradiance.

Conventionally, most vision-based systems rely on build-in AE algorithms [17,28] to adjust the exposure time. Research methods for AE can be classified into three types. The first type uses image statistics as feedback. The most common approaches [19, 36] move the average intensity of images to a mid-range (e.g., 128 for 8-bit images). Improved methods adopt the image entropy [24] and histograms [27,30] to increase the robustness. However, converging to proper exposure requires many image samples and an even distribution of scene illumination, making the adjustment slow in a natural scene.

The second type of research leverages prior knowledge, like a predefined pattern [29], to increase the convergence speed. But such methods work poorly in an unknown scene.

The third type introduces quality-based loss functions to get better performance in a natural scene. Shim et al. [37] used the image gradient as a metric. They computed a linear loss for each image synthesized with gamma mapping to find a proper exposure adjustment step. For a faster convergence, they further introduced a nonlinear loss in [38]. Zhang et al. [44] improved the loss and considered the camera response function for SLAM tasks. However, metric-based methods are easily affected by motion blur. The blurred image hardly provides correct information for calculating the quality loss, thus limiting their performance.

A natural scene has a very high dynamic range, much higher than a camera can sense. Thus, AE methods are needed to control the total amount of light received by the sensor, i.e., exposure, to help keep most pixels immune from saturation.

Meter-based auto-exposure (M-AE). The task of MAE is to use light meters [15] to measure the radiance $\tilde{L}$ (u, t) and compute the optimal camera exposure of j-th capturing $H_j$(u $$Hj(u) -= FM(\tilde{L}(u, t), K_u),$$

where u=(x; y)$^T$ is the pixel position, t is time, $K_u$ defines the calibrated camera lens parameters, $f_M$ is a linear function for estimating the exposure. The estimated result is inaccurate because the light meter can only give the average of the scene's illumination. Besides, the optical system for metering also makes a camera using it bulky and expensive.

Image-based auto-exposure (I-AE). Without light meters, most vision-based systems directly use images to adjust the exposure:

$$H_j(u) = f_I(I_j - 1),$$

where $f_I$ is a function that maps images to optimal exposure, $I_j$i−2={$I_i$(u)|I==I=1, . . . , j−1} is the image set that contains images before the j-th capturing. Most I-AE methods rely on a feedback pipeline to gradually converge to an optimal exposure. That is not only a waste of image samples but it also makes I-AE easily affected by challenging natural illumination.

SUMMARY OF THE INVENTION

The problems of the prior art are addressed according to the present application by extending the formulations of Pan et al. [34], which use an integral model to describe the latent image and then complete the deblurring and frame reconstruction, so as to fit the non-linear case and then combine it with a contrast value calculated from a hardware parameter, allowing fast irradiance computing. This is achieved by introducing a novel sensor, i.e., the dynamic vision sensors (DVS) [5], to conduct the EC with a conventional active pixel sensor (APS).

This novel event-guided auto-exposure (EG-AE) leverages the dynamic vision sensor's high dynamic range and low latency properties to guide the exposure setting of the active pixel sensor. Physical connections of images and events are used to estimate the irradiance variations, which is further fed into the EG-AE for calculating the exposure setting.

Event-guided auto-exposure (EG-AE). Complementary to the active pixel sensor (APS), the dynamic vision sensor (DVS) provides a low latency event stream, which encodes the scene's illumination changes in a very high dynamic range. That means the event stream can be the ideal data to guide the camera exposure. Thus, the task of the EG-AE is to utilize two modalities to estimate the scene illumination and compute the optimal exposure:

$$Hj(u) = f_{eg}(Ij-1, \mathcal{E}),$$

where $f_{EG}$ is the function that leverages the events set ε and images set Ij−1 to give the optimal exposure. The main challenges of EG-AE come from finding the physical connection between two modalities and developing an efficient framework that fully exploits this connection to compute the irradiance for camera exposure control.

The advantages of DVS include high dynamic range (HDR, >130 dB [5]), low latency (1 μs [12]), and low motion blur [10], which make it an ideal sensor for operating in harsh environments. The HDR and low motion blur of the DVS provide it with HDR sensing ability to compute the scene's illumination without being affected by relative motions. The low latency of the DVS allows the exposure adjustment to be done before the APS exposure, thereby vastly shrinking the response time to the microsecond level. However, as the DVS only responds to the illumination change, it cannot be used alone to directly compute the correct absolute illumination. An estimation framework leveraging both absolute signals from an APS and the relative signals from a DVS is demanding. This application uses an efficient event-based framework for irradiance estimation.

The nonlinearity of camera response and DVS hardware principles are considered in extending previous event-based double integration, Pan et al. [34], to provide physically meaningful irradiance effectively. Based on the result, a novel event-guided auto exposure is used, which is believed to be the first AE method based on the event camera. The method of the present application is simple yet effective, which largely shrinks the response time and reduces the number of saturated image samples. As shown in FIG. 1C (upper images), conventional AE methods need multiple image samples to conduct the feedback adjustment until the system converges, causing the images to be over-exposed. In contrast, the method of the present application directly adjusts the exposure time using events and images. See FIG. 1C (lower images). Thus, subsequent images are clear and without saturation. Besides, the present application can be used in downstream applications, all of which show clear improvements. In summary, the contributions of the application are:

- a novel computational framework, event-based irradiance estimation (E-IE), which considers the nonlinearity of a camera response and utilizes the principle of DVS hardware to estimate a contrast value, allowing efficient estimation of the physically meaningful irradiance.
- a novel exposure control method called "event-guided auto-exposure (EG-AE)," which reduces the response time of the exposure adjustment and alleviates image saturation.

BRIEF SUMMARY OF THE DRAWINGS

This patent or application file contains at least one drawing executed in color. Copies of this patent or patent application publication with color drawing(s) will be provided by the Office upon request and payment of the necessary fee. The foregoing and other objects and advantages of the present application will become more apparent when considered in connection with the following detailed description and appended drawings in which like designations denote like elements in the various views, and wherein:

FIGS. 4A-4G illustrate image deblurring results in two sequences or events, the upper sequence showing a line and the lower sequence showing a pair of scissors, and wherein FIG. 4A shows events, FIG. 4B shows the static images, FIG. 4C shows the application of a conventional Pan method and FIG. 4D shows the application of a learning based method that both fail to recover the heavily blur images, FIG. 4E shows that the high frame rate event camera method works well when the background is clear but is unable to tackle heavily blurred images, FIG. 4F shows that the method of the present application stably reconstructs clear images from the irradiance shown in FIG. 4G;

FIG. 5B is a DAVIS 346 acoustic emission (AE) Event camera v. the present application and FIG. 5C is I-AE v. the present application;

FIG. 8A is the blurred image, FIG. 8B and FIG. 8C show that the present application can deblur the image and thus successfully detect the Apriltag;

FIG. 9A shows a saturated image with the DAVIS AE method, FIG. 9B show the present application alone resulting in a well-exposed image, FIG. 9C shows the present application combined with E-1E for deblurring and FIG. 9D shows the present application with speeded up robust features (SURF) and feature matching as described in article [4].

DETAILED DESCRIPTION

Figure 1A:
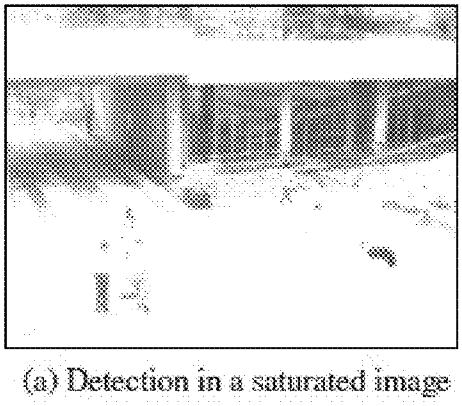
FIG. 1A is a prior art over exposed image.
Figure 1B:
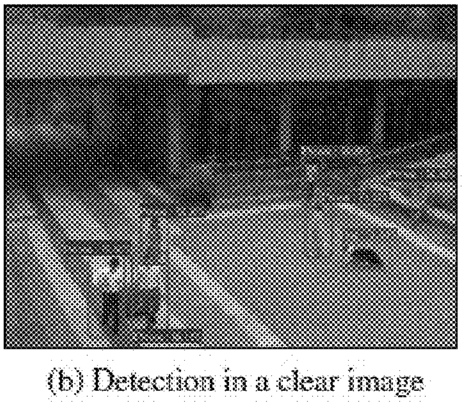
FIG. 1B is correctly exposed clear image according to the present application, and FIG. 1C (upper images) show multiple image samples for conventional auto-exposure feedback adjustment, while FIG. 1C (lower images) show event-guide auto-exposure (EG-AE) according to the present application directly adjusting exposure setting using events and images.
Figure 1C:
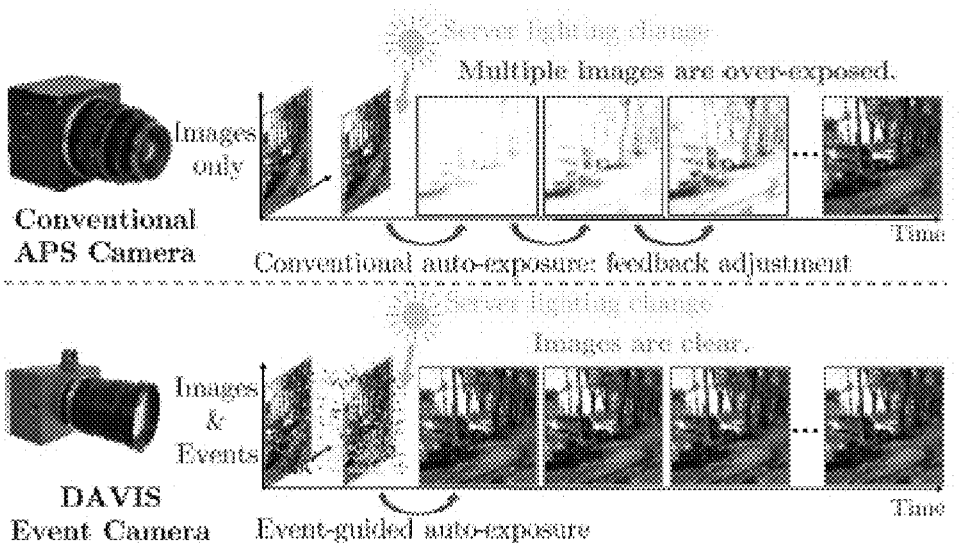
Figure 2:
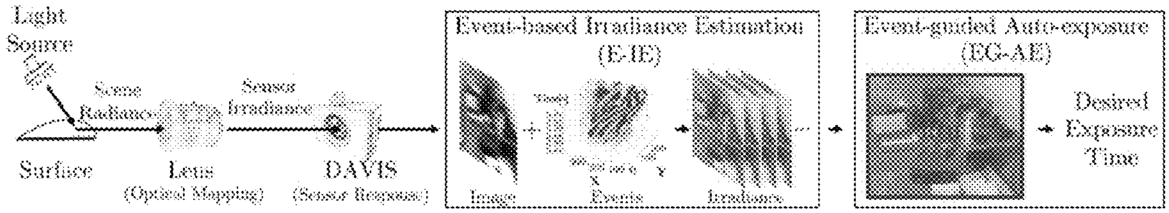
FIG. 2 shows the processing method according to the present application.

FIG. 2 illustrates the overall pipeline of the method of the present application, which aims to estimate the high rate irradiance in order to allow improved exposure control. With this method the scene radiance created by light from a source 10 being reflected from a surface 12 is first linearly mapped to a sensor 16 as sensor irradiance by a lens 14. Then the active pixel sensor (APS) and dynamic vision sensor (DVS) in the sensor will respond to the irradiance to generate events and images 20 for irradiance estimation. The event-guided auto-exposure (EG-AE) 30 utilizes the estimated irradiance to compute the desired exposure time. Thus, the pipeline consists of three parts. The first part is the formation of events and images. The second part shows how the physical connections of DVS and APS are leveraged to estimate the irradiance. The third part illustrates how the estimated irradiance is adopted for exposure control.

Optical mapping. There are two steps for a camera to map the scene's illumination into a digital signal, i.e., the optical mapping and the sensor response. First, the lens 14 will linearly map the scene radiance to the sensor irradiance. The mapping of the lens system could be described by E(u; t)=K(u)L(u; t), where E(u; t) and L(u; t) are the irradiance and radiance of pixel u=(x; y)T at time t respectively. K(u) is the lens parameter of pixel u, which is a constant for most cameras. Using the recently introduced DAVIS 346 AE event camera, [5] that gives pixel-aligned DVS events and APS images concurrently, the optical mapping is suitable for both events and images. The DAVIS 346 acoustic emission (AE) is a 346×260 pixels DVS event camera with an included active pixel frame sensor or APS. After the optical mapping, the APS and DVS will respond to the irradiance and transform it into images and events correspondingly.

APS radiometric response. For a continuous irradiance signal, the APS exposes the scene to form a sequence of images. There are two equivalent ways to control the exposure, i.e., by adjusting aperture size or exposure time. The present embodiment of the application assumes, but is not limited to, a camera using a lens with a fixed aperture. Thus, the exposure is solely controlled by the exposure time. The APS will accumulate the irradiance during the exposure time and transform it to digital images. Thus, exposure equals the integration of irradiance over exposure time, which also equals the average irradiance times the exposure time:

$$H_j(u) = \int_{t_j}^{t_j+T_j} E(u, \tau)d\tau \quad (1)$$

$$= T_j \ddot{E}_j(u), \quad (2)$$

where $H_j(u)$ and $T_j$ are the exposure and the exposure time of image j correspondingly, $t_j$ is the starting time of j-th exposure, $E_j(u)$ is the average value of irradiance over the duration of the j-th exposure. Then the APS transforms the exposure to digital images in a nonlinear manner. This nonlinear radiometric response can be described by the camera response function (CRF) [13] as follows:

$$I_j(u) = f(H_j(u)), \quad (3)$$

where f defines the CRF that maps exposure $H_j(u)$ of the j-th image to corresponding image intensity $I_j(u) \epsilon \{0, \ldots, 255\}$.

DVS log-irradiance response. The DVS works asynchronously to respond to the changes in the log of irradiance, and generates a stream of timestamped address events $\varepsilon=\{e_{k|}k=1, \ldots, N_{ev}\}$, where $N_{ev}$ is the number of events. Each event is a 4-dimensional tuple $e_k \doteq (u_k, t_k, p_k)$, where $u_{k=(x}k, yk)^T$ is the pixel position, tk is the triggering time, pkϵ{−1, +1} is polarity indicating the increase (ON event-s_or decrease (OFF events) of log irradiance, i.e., Pk=1 if $\theta_k < C_{OFF}$. $C_{ON}>0$ and $C_{OFF}<0$ are contrast values, $\theta_k = \ln €(u_k, t_k)) - \ln(E(u_k, t_k - \Delta t))$ is the change in the log of irradiance of pixel $u_k$ from time $t_k - \Delta t$ to $t_k$.

Event-based Irradiance Estimation (E-IE). The task of EG-AE requires the irradiance to compute the desired exposure time. However, it is difficult to estimate the irradiance based solely on events or images. Events only encode the relative change of log irradiance, missing the absolute reference. Motion blur makes it impossible for the image to provide an irradiance reference. Thus, events and images must be unified. Events provide an estimation of the fluctuating irradiance during the exposure, allowing the image to give a correct reference.

To do that, the estimation in the form of a reference irradiance times relative irradiance must be formulated as follows:

$$\hat{E}(u, t; t_{ref}) = E(u, t_{ref}) \Delta E(u, t' t_{ref}) \quad (4)$$

where Ê (u, t; $t_{ref}$) is the estimated irradiance of pixel u at time t, computed from reference irradiance E(u, $t_{ref}$ (at reference time $t_{ref}$ΔE(u, t'$t_{ref}$)) denotes the relative irradiance from reference time $t_{ref}$ to time t:

$$\Delta E(u, t; t_{ref}) = \frac{E(u, t)}{E(u, t_{ref})}. \quad (5)$$

The reference irradiance E (u; $t_{ref}$) can be derived from the image exposure by letting $t_j$ be the reference time $t_{ref}$. Relating Eq. 1 and Eq. 2 and separating the continuous irradiance using Eq. 5:

$$T_j \ddot{E}_j(u) = \int_{t_j}^{t_j+T_j} E(u, \tau)d\tau \quad (6)$$

-continued $$= \int_{t_j}^{t_j+T_j} E(u, \tau)\Delta E(u, \tau, t_j)d\tau.$$

As the reference irradiance E(u; $t_j$) is a constant, it can be move out of the integration in Eq. 6. Then by moving the exposure time $T_j$ to the right, it can be seen that the right side is a reference irradiance times the average of relative irradiance:

$$\begin{aligned}\overline{E}_j(u) &= E(u, t_j)\frac{1}{T_j}\int_{t_j}^{t_j+T_j} \Delta E(u, \tau; t_j)d\tau \\ &= E(u, t_j)\Delta\overline{E}_j(u; t_j)\end{aligned}, \quad (7)$$

where (Δt)(u; tj) is the average of relative irradiance over the duration of j-th exposure. Rearranging Eq. 7, produces:

$$E(u, t_j) = \frac{E_j(u)}{\Delta\overline{E}_j(u; t_j)}. \quad (8)$$

Plugging Eq. 8 into Eq. 4 ($t_j = t_{ref}$), causes the irradiance estimation to turn into three approximations, i.e., the approximation of relative irradiance ΔE (u; t; $t_j$), its average $\Delta\overline{E}_{jj}$(u; $t_j$), and average of irradiance $\overline{E}_j$(u):

$$\hat{E}(u, t; t_j) = \frac{\overline{E}_j(u)\Delta E(u, t; t_j)}{\Delta E_j(u; t_j)}. \quad (9)$$

Approximation of the relative irradiance. The DVS events encode the relative irradiance in the log space. Thus, all of the events can be directly summed up from a reference time $t_j$ to time t to approximate the log relative irradiance, and then the exponentiation of it can be taken to get the relative irradiance:

$$\Delta E(u, t; t_j) \approx \exp\left(\sum_{t_k \in [t_j, t]} h(u, e_k)\right), \quad (10)$$

where event $e_k = (u_k, t_k; p_k)$ subjects to $t_k \in [t_j; t]$, h is the mapping function that maps the event in position u to corresponding contrast value:

$$h(u, e_k) = \begin{cases} C_{ON}, & \text{if } u = u_k, p_k = 1, \\ C_{OFF}, & \text{if } u = u_k, p_k = -1, \\ 0, & \text{otherwise.} \end{cases} \quad (11)$$

Approximation of the average of irradiance. Plugging Eq. 2 into Eq. 3, the image intensity Ij(u) can be inversely mapped to corresponding average irradiance $\overline{E}_j$(u):

$$E_j(u) \approx \frac{1}{T_j} f^{-1}(I_j(u)) \text{ s.t. } 1 \le I_j(u) \le 254, \quad (12)$$

where $f^1$ is inverse CRF. Here only the pixel intensity from 1 to 254 is used for estimation, because the value 0 and 255 indicates that the exposure is beyond the dynamic range.

Figure 3A:
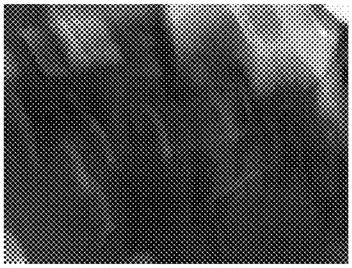
FIG. 3 illustrates an original and reconstructed image using different estimation methods with FIG. 3A showing a blurry image, FIG. 3B showing a reconstructed image formed by fixed step sampling contaminated by noise, and FIG. 3C showing how nonuniform sampling outperforms the fixed step sampling by suppressing noise.
Figure 3B:
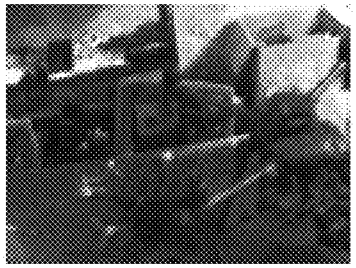

Approximation of the average of relative irradiance. A straightforward method to approximate the average involves summing up all relative irradiance at a fixed step and taking its average. But since the event noise is evenly distributed over time, this method gives an equal weight to the noise. Thus, the result will be biased by noise, as shown in FIG. 3B where FIG. 3A is the original blurry image. To increase the weight of the effective signal over the noise, a non-uniform sampling method can be used. In this non-uniform method, the relative irradiance is summed up at all event timestamps, regardless of whether the events are in pixel u. As relative motions trigger many events in a short duration, more irradiance is naturally summed at the durations with more effective signals, suppressing the evenly distributed noise.

Figure 3C:
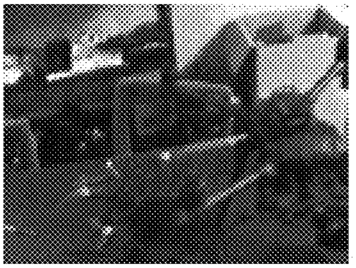

The average of relative irradiance over duration [tj; t] is given by:

$$\Delta\overline{E}(u; t_j) \approx \frac{1}{N_{ev}}\sum_{s=1}^{N_{ev}} \exp\left(\sum_{k=1}^{s} h(u, e_k)\right) \quad (13)$$
$$\text{s.t. } t_k \in [t_j, t],$$

where Nev is the total number of events. The reconstructed images using Eq. 13 are shown in FIG. 3C, which is cleaner than FIG. 3B. This shows that the nonuniform sampling outperforms the fixed step sampling since it can suppress noise.

Irradiance reconstruction. After the above approximations, the irradiance at time t can be estimated by plugging Eq. 10, Eq. 12 and Eq. 13 into Eq. 9. As saturated pixels cannot give correct exposure, the latest unsaturated pixels are used to recover the reference irradiance and they are combined with the irradiance estimated from previous unsaturated pixels:

$$\hat{E}(u, t) = \begin{cases} \hat{E}(u, t; t_j), & \text{if } 1 \le I_j(u) \le 254, \\ \hat{E}(u, t; t_n), & \text{otherwise,} \end{cases} \quad (14)$$

where Ê (u; t) is the output irradiance of the E-IE framework, $t_n$ is the exposure starting time of the previous unsaturated pixel, j>n, n=0 indicates that the irradiance is estimated from the initial value E(u; 0), which is a synthesized high dynamic range (HDR) irradiance using [8]. Given the estimated irradiance Ê (u; t) from Eq. 14, the intensity images can be reconstructed using the camera response function (CRF):

$$\hat{I}(u, t) = f\left(T_j\hat{E}(u, t)\right) \text{ s.t. } t \in (t_j, t_{j+1}), \quad (15)$$

where Î(u; t) is the image intensity of pixel u at time t, $T_j$ is the exposure time of image j. When the irradiance is accurately estimated, the reconstructed images will be clear without blur. And the frame rate of reconstructed images could be, in theory, as high as the DVS's event rate. Thus, in addition to the irradiance estimation, complete image deblurring and high-rate frame reconstruction tasks are also completed.

Next, the event-guided auto exposure (EG-AE) uses the estimated irradiance Ê (u; t) to compute the desired exposure time for image capturing.

The dynamic range of the active pixel sensor (APS) is generally low, i.e., <60 dB, and is unable to fully cover lighting in a natural scene. Thus vision-based systems working in natural scenes need to adjust the exposure time to make sure most pixels in the APS are immune from saturation. Using events from the DVS, the possible sensing range extends beyond 130 dB. Thus, the HDR sensing capability of DVS can be leveraged to guide exposure setting for APS capturing. To do that, the average of estimated irradiance can be mapped to the middle value of CRF using a proper $I_d$, i.e., $I_d=f(\frac{1}{2}(f-(255)+f^{-1}(0)))$. In this way, except for extreme irradiance distribution, the illumination of most scenes can be covered by a camera's dynamic range. Given the desired intensity $I_d$, the desired exposure time is given by:

$$T_d(t;\mathcal{P}) = \frac{1}{f^{-1}(I_d)N_p}\sum_{u\in\mathcal{P}}\hat{E}(u, t), \tag{16}$$

where Np is the pixel number in a region of interest (ROI) P. For most vision-based systems, the ROI can be set to the whole imaging plane.

In order to evaluate the methods of the present application, real-world data was recorded by a DAVIS 346 event cameras.

Calibration of contrast values. To estimate the relative irradiance from a set of events, the contrast values $C_{ON}$ and $C_{OFF}$ in Eq. 11 need to be known. However, current methods as disclosed in articles [6, 42] estimate the contrast from pre-recorded data and thus suffer from the noise. To remove the effect of noise, methods established in article [31] are introduced, which directly compute a relatively accurate contrast from DVS settings using known hardware parameters:

$$C_{OFF} = \frac{\kappa_n C_2}{\kappa_p^2 C_1}\ln\left(\frac{I_{OFF}}{I_d}\right),\ C_{ON} = \frac{\kappa_n C_2}{\kappa_p^2 C_1}\ln\left(\frac{I_{ON}}{I_d}\right), \tag{17}$$

where the $K_n$=0:7 and $K_p$=0:7 are the back gate coefficients of n and p FET transistors. C1/C2 is the capacitor ratio of DVS (130/6 for the DAVIS 346 sensor). $I_d$, $I_{ON}$, and $I_{OFF}$ are the bias current set by user in a coarse-fine bias generator [9]. This current could be computed with jAER toolbox [3]. The contrast is set to $C_{ON}$=0:2609, $C_{OFF}$=–0:2605, and remainder was fixed in all experiments. As can be seen in Table 1 where the lower the value of deblurring, the better, the present application was better than the methods in articles [33], [26] and [34] with respect to PIQE [39], SSEQ [22] and BRISQUE [26].

Calibration of CRF. Camera manufacturers design the CRF to be different for each kind of camera. Thus, the CRF needs to be calibrated and the inverse CRF needs to be derived from the calibrated result. The method of article [8] is used for calibrating the CRF, which requires a set of static images with different exposure times.

Dataset. Since current datasets do not include the details of hardware settings and radiometric calibration data, an evaluation dataset was recorded, which included different motions (e.g., shaking, random move) and scene illuminations (e.g., low lighting conditions, sunlight, artificial light).

Implementation details. All the experiments were conducted using a laptop with Intel i7-10870H@2.2 GHz CPU. A synchronized stereo rig was constructed with identical hardware setups for two DAIVS 346 cameras. C++ software was used to implement the algorithms on a DV-Platform. The overall framework event rate of the embodiments exceeded 8 million events per second.

Figure 4A:
Figure 4B:
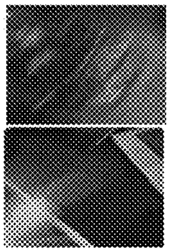
Figure 4C:
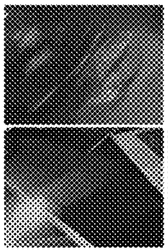
Figure 4D:
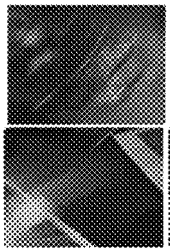
Figure 4E:
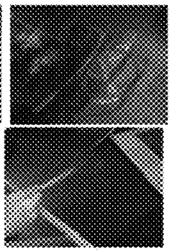
Figure 4F:
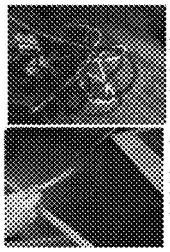
Figure 4G:
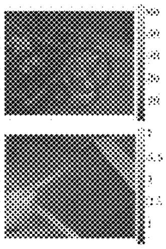

Irradiance Reconstruction In order to evaluate the effectiveness of the event-based irradiance estimation (E-IE) framework of the present application, the irradiance at the starting time of each exposure was first reconstructed and then used with the corresponding exposure time to reconstruct an image from the irradiance. When the irradiance estimation was accurate, the reconstructed images were clear. Otherwise, the estimation error caused the image to blur. Then the results of the present application were compared with other state-of-the-art image deblurring methods, including the conventional method [33], the learning-based method [16], and the event-frame reconstruction method [34]. Qualitative results are shown in FIG. 4 where FIG. 4A shows events, i.e., a line (top image) and scissors (bottom image). Multiple No-reference metrics, i.e., SSEQ [22], PIQE [39], and BRISQUE [26] were used to provide quantitative comparisons. The average scores in the dataset are shown in Table 1, where the lower score, the better.

TABLE 1

Average image quality scores of deblurring (Better: ↓)

| | Method | | | |
|---|---|---|---|---|
| Metric | [33] | [16] | [34] | EG-AE |
| PIQE [39] | 62.92 | 54.71 | 42.55 | 38.12 |
| SSEQ [22] | 31.64 | 37.58 | 32.04 | 24.01 |
| BRISQUE [26] | 32.53 | 37.39 | 35.04 | 28.75 |

From Table 1, we can see that the application (EG-AG) achieves the best score regarding all metrics. Other methods get suboptimal scores because their heavily blurred images hardly provide any useful information for reconstruction. From FIG. 4, it can be seen that both the present invention and the method of article [34] FIG. 4E handle the partial blur well, e.g., the blur of a moving scissor in FIG. 4B. However, for completely blurred images, only the present application was able to reconstruct clear images in the top image of FIG. 4F. The method of article [34] is unable to find an optimal contrast value, the methods of the other two articles including the conventional method [16, 33], shown in FIGS. 4D and 4C, cannot handle such a challenging blur.

Exposure Control. The present invention was compared with multiple EC methods, including manually adjusted exposure (ME), the built-in AE of DAVIS and the state-of-the-art I-AE method of article [38]. For ME, the exposure time was adjusted at the beginning of each experiment then remained fixed. For I-AE, the non-linear version in article [38] was re-implemented with stable parameters. Comparisons were made in pairs, i.e., one DAVIS runs the EG-AE of the present invention, another runs a conventional method for comparing. The EG-AE of the present application was tested in challenging illuminations that contain very bright lighting. Without a proper adjustment, images taken from APS will be heavily over-exposed. Thus, these methods were first evaluated using the over-exposed rate: the average number of over-exposed pixels divided by the number of total pixels over the whole sequence. The results are shown in Table 2. Also, the image quality was evaluated and the results were summarized in Table 3.

TABLE 2

Average over-exposed rates (%) of EC methods (Better: ↓)

| Method | Scene: Book | Sunlight | Lab | Desktop | cloud |
|---|---|---|---|---|---|
| ME | 53.81 | 43.53 | 8.82 | 20.87 | 78.39 |
| DAVIS 346 AE[5] | 10.12 | 6.15 | 18.69 | 12.32 | 21.96 |
| I-AE[38] | 20.50 | 32.92 | 15.61 | 8.78 | 45.70 |
| EG-AE | 0.009 | 1.37 | 0.09 | 2.29 | 4.24 |

TABLE 3

Average image quality scores of EC methods (Better: ↓)

| Metric | Method: ME | DAVIS 346 AE[5] | I-AE[38] | EG-AE |
|---|---|---|---|---|
| PIQE [39] | 53.81 | 42.95 | 47.64 | 33.64 |
| SSEQ [22] | 46.51 | 36.43 | 40.28 | 30.98 |
| BRISQUE [26] | 50.24 | 41.70 | 41.33 | 38.55 |

From Table 2 it can be seen that the EG-AE application significantly reduces the over-exposed rate. That means the EG-AE application can properly set the exposure time to alleviate saturation, which improves the image quality and helps the EG-AE get the best quality score in Table 3.

Figure 5A:
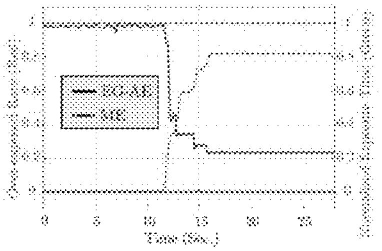
FIGS. 5A-5C are comparisons of over-exposed rates and normalized exposure times in book sequence wherein green curves are the normalized exposure time and the red curves are the over-exposed rate (methods marked by different types of lines as shown in the legend), a lamp is used to light the book in a box randomly and synchronized paired results are presented in FIG. 5A for ME v. the present application.

In the book scene illustrated in FIG. 6, a photography lamp is used to light a book in a box. The lighting was randomly increased to create illumination gaps. The paired normalized exposure time and paired over-exposed rate is shown in FIG. 5, wherein green curves are the normalized exposure time and the red curves are the over-exposed rate (methods are marked by different types of lines as shown in the legend). The lighting from the lamp is used randomly and in synchronized pairs and the results are presented in FIG. 5A for ME v. the present application, FIG. 5B is a DAVIS 346 acoustic emission (AE) Event camera v. the present application and FIG. 5C is I-AE v. the present application.

Figure 5B:
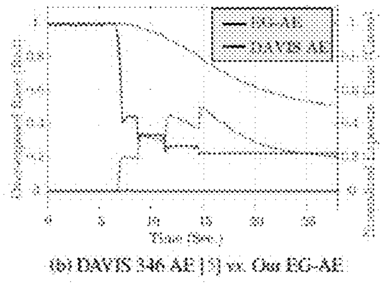
Figure 5C:
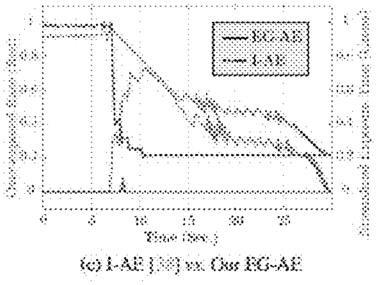
Figure 6A:
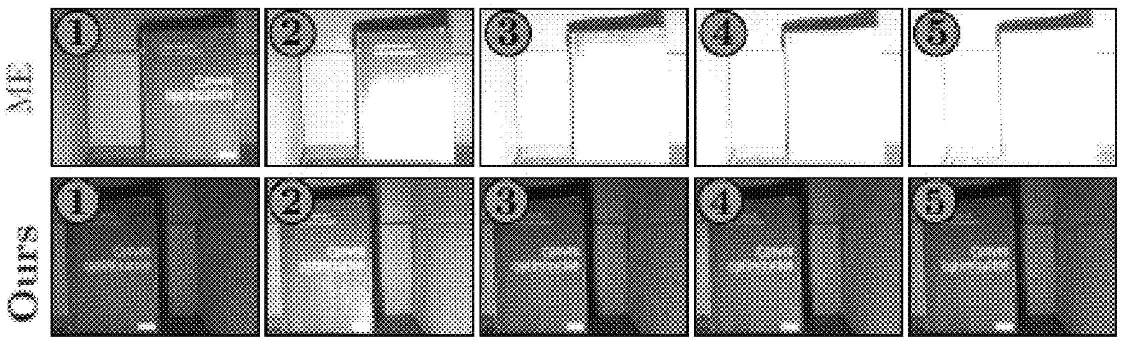
FIGS. 6A-6C illustrate qualitative comparisons of EC methods in a scene showing a book where synchronized image sequences are presented in FIG. 6A for ME v. the present application, FIG. 6B for DAVIS 346 AE v. the present application and FIG. 6C for I-AE v. the present application for comparison.
Figure 6B:
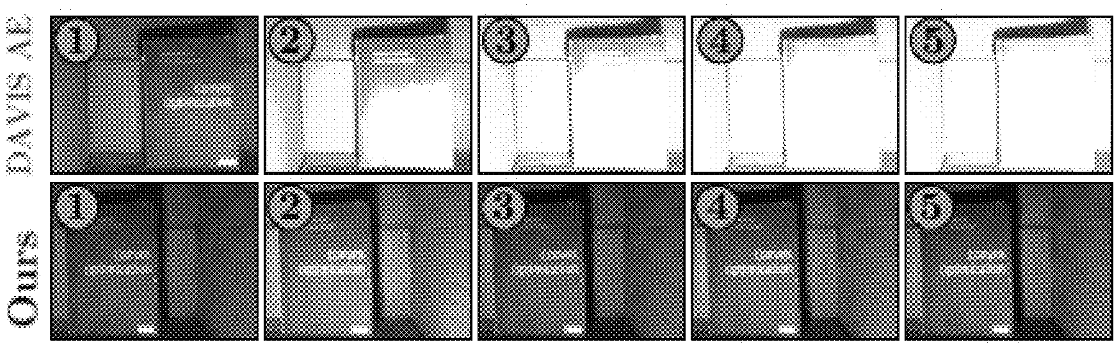
Figure 6C:
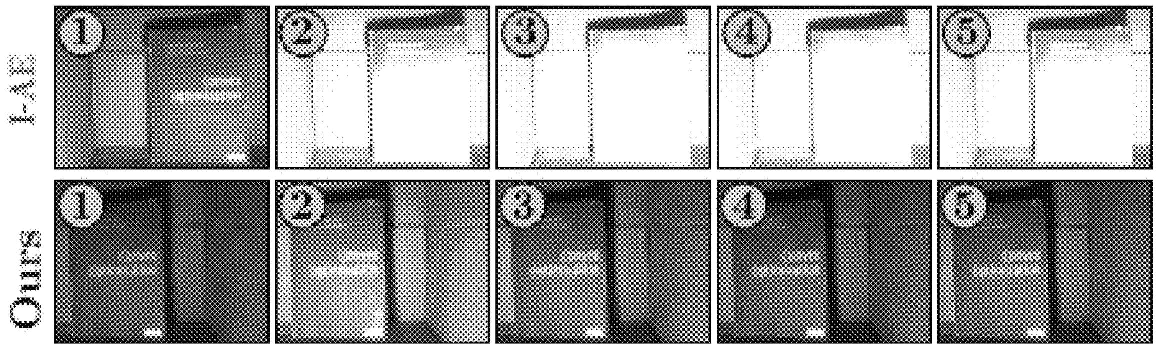
Figure 7A:
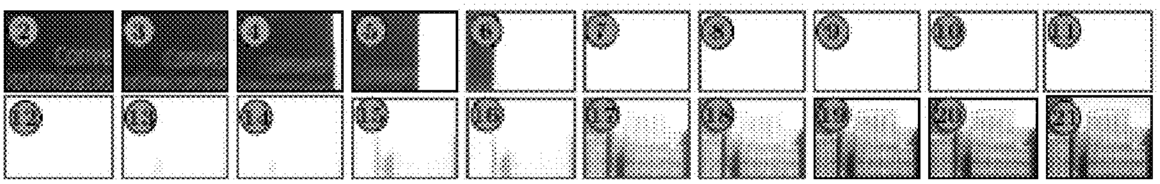
FIGS. 7A-7C are comparisons of lighting adaption with state-of-the art devices, including DAVIS 346 AE FIG. 7A, GoPro HERO FIG. 7B, and HUAWEI Mate 30 FIG. 7C with FIG. 7D showing the present application.
Figure 7B:
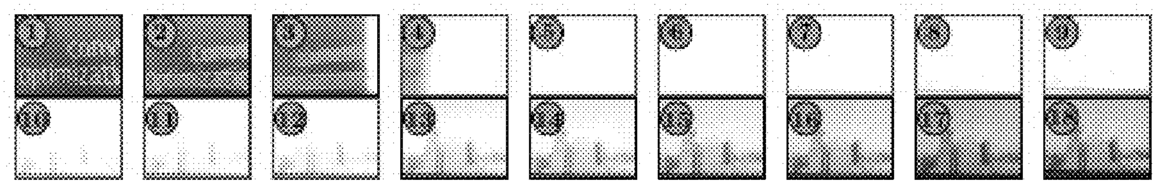
Figure 7C:
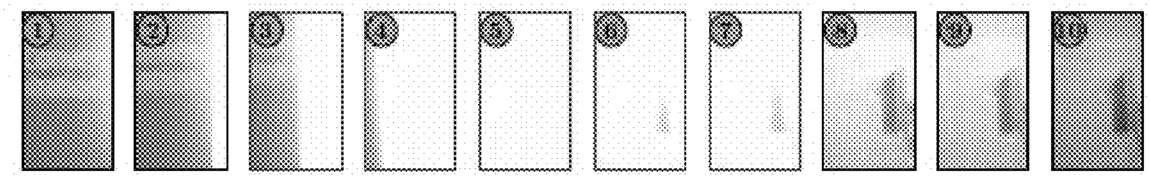
Figure 7D:
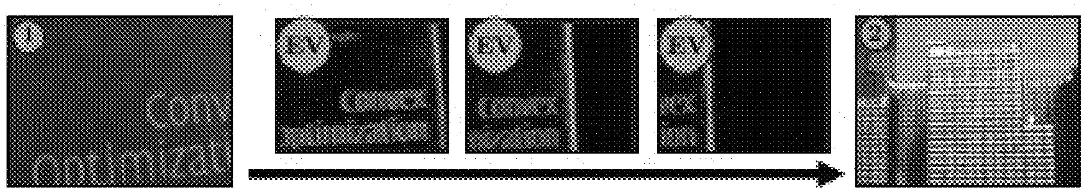

In FIG. 5A-C, it can be seen that the EG-AE method can quickly adjust the exposure time to ensure the next image capture will not be affected by saturation. While the ME method cannot capture unsaturated images after the lighting changed, as shown in FIG. 6A. Both I-AE [38] and DAVIS 346 AE [5]methods need a long time to converge to a stable exposure time, which increases the overexposed rate in FIGS. 5B and 5C, and causes saturations, as demonstrated in FIGS. 6B and 6C.

Comparisons with off-the-shelf devices. To further evaluate the effectiveness of the new EG-AE method, tests of the method were carried out in an extreme illumination condition and compared with the current state of-the-art devices, including HUAWEI Mate 30 [2], GoPro HERO 7 [1], and DAVIS 346 [5]. In these tests the sensor was first covered with a book to generate a low lighting condition (<90 Lux) and then the book was moved away quickly to expose the sensor to sunlight directly (>3000 Lux). To fully evaluate the application, the snapshot mode of the DAVIS camera was used to take images. The first image was captured under low lighting conditions and the second image was captured after having fully moved the covering book away. In this way, there was no chance to use image samples in between to estimate the irradiance. The results are shown in FIG. 7, in which it can be seen that all of these devices require multiple image samples to converge to a good exposure setting. As a result, multiple images are over-exposed during the adjustment. In contrast, the present application leverages events to compute the irradiance and directly adjust to arrive at the correct exposure time. The clear image is captured immediately thereafter.

The methods of the present application increase the imaging quality and thus may benefit many applications. Here, are two examples.

Figure 8A:
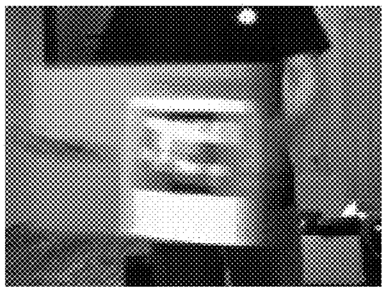
FIGS. 8A-8C are the results of Apriltag detection as described in article [32] where
Figure 8B:
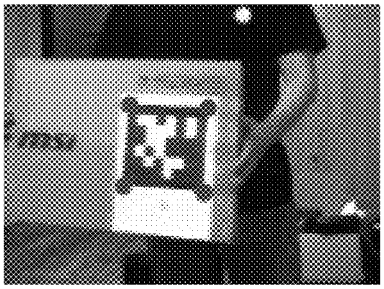
Figure 8C:
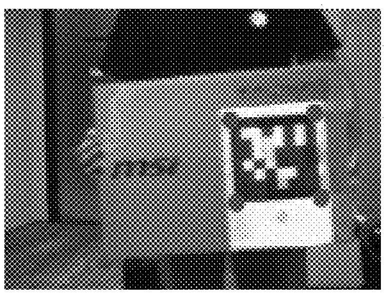

Visual tag detection. The event-based irradiance estimation framework (E-IE) of the EG-AE method of the present application can improve visual tag detection because of its effectiveness for image deblurring. As shown in FIG. 8A, large motions will blur the visual tag in images, while the reconstructed clear image of the present framework can properly preserve effective information for successful Apriltag [32] detections as shown in FIG. 8B and FIG. 8C. In that sequence, 206 images contain Apriltags. Without the assistant of the present application, only 73 images were detected. With the present application, the successful detections increased to 198.

Figure 9A:
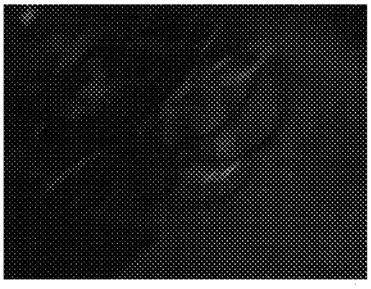
FIGS. 9A-9D show the results of feature matching where
Figure 9B:
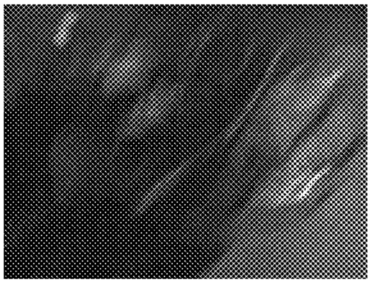
Figure 9C:
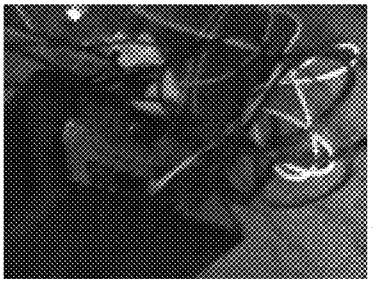
Figure 9D:
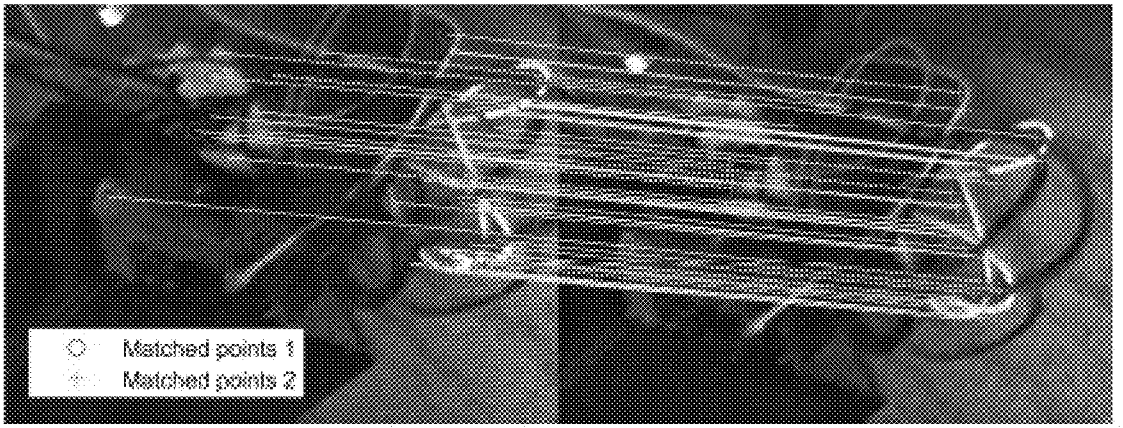

Feature matching and tracking. The present methods can benefit feature matching and tracking due to their capability of essentially improving image quality. As shown in FIG. 9A, images taken in low light conditions with conventional AE are under-saturated and can barely provide any information for image recovery or other tasks. In contrast, the EG-AE sets a correct exposure time as shown in FIG. 9B, and then adding E-IE allows for recovery of a clear image as shown in FIG. 9C, allowing successful SURF [4] feature matching as shown in FIG. 9D.

The present invention can be compared with conventional EC methods for feature tracking using multiple indoor trajectories. The results are summarized in Table 4. As can be seen, EG-AE gets the most effective matching regarding all features in that table. That is because the EG-AE of the present invention can quickly adjust the exposure time, which preserve more gradient information for feature tracking.

TABLE 4

Average matched inliers of feature tracking (Better: ↑)

| Feature | Trajectory 1: ME | Trajectory 1: Ours | Trajectory 2: [5] | Trajectory 2: Ours | Trajectory 3: [38] | Trajectory 3: Ours |
|---|---|---|---|---|---|---|
| SURF[8] | 43.2 | 92.1 | 82.4 | 100.4 | 100.8 | 106.8 |
| FAST [35] | 18.7 | 41.6 | 29.1 | 46.1 | 44.3 | 73.6 |
| MSER [25] | 30.9 | 42.3 | 44.0 | 51.6 | 60.2 | 84.6 |
| BRISK [20] | 34.5 | 67.8 | 56.2 | 73.3 | 78.7 | 112.4 |
| Harris [14] | 26.9 | 43.6 | 50.4 | 65.1 | 80.7 | 89.9 |

The present invention provides a novel auto-exposure (AE) method that leverage the event camera's high dynamic range and low latency properties to adjust the exposure setting. The physical connections of DVS and APS and other hardware properties are considered in the proposed event-based irradiance estimation (E-IE) framework, allowing exposure control, irradiance estimation, and image deblurring to be efficiently done. Extensive experiments have demonstrated that the methods of the present invention can robustly tackle challenging lighting variations and alleviate saturation. Besides, these methods essentially increase the image quality, thereby benefit multiple downstream tasks.

REFERENCES

The cited references in this application are incorporated herein by reference in their entirety and are as follows:

[1] GoPro hero 7. https://gopro.com/en/us. 7, 8
[2] Huawei mate 30. https://consumer.huawei.com/en/phones/mate30/.7, 8
[3] jaer project. http://jaerproject.org. 6
[4] Herbert Bay, Andreas Ess, Tinne Tuytelaars, and Luc Van Gool. Speeded-up robust features (surf). Computer vision and image understanding, 110(3):346-359, 2008. 8
[5] Christian Brandli, Raphael Berner, Minhao Yang, Shih-Chii Liu, and Tobi Delbruck. A 240 180 130 dB 3 is latency global shutter spatiotemporal vision sensor. IEEE Journal of Solid-State Circuits, 49(10):2333-2341, 2014. 2, 3, 6, 7, 8
[6] Christian Brandli, Lorenz Muller, and Tobi Delbruck. Realtime, high-speed video decompression using a frame- and event-based DAVIS sensor. In 2014 IEEE International Symposium on Circuits and Systems (ISCAS), pages 686-689. IEEE, 2014. 5
[7] Huaijin Chen, Wanjia Liu, Rishab Goel, Rhonald C Lua, Siddharth Mittal, Yuzhong Huang, Ashok Veeraraghavan, and Ankit B Patel. Fast retinomorphic event-driven representations for video gameplay and action recognition. IEEE Transactions on Computational Imaging, 6:276-290, 2019. 2
[8] Paul E. Debevec and Jitendra Malik. Recovering high dynamic range radiance maps from photographs. In ACM SIGGRAPH 2008 classes, pages 1-10. 2008. 5, 6
[9] Tobi Delbruck, Raphael Berner, Patrick Lichtsteiner, and Carlos Dualibe. 32-bit configurable bias current generator with sub-off-current capability. In 2010 IEEE International Symposium on Circuits and Systems (ISCAS), pages 1647-1650, 2010. 6
[10] Tobi Delbruck, Yuhuang Hu, and Zhe He. V2e: From video frames to realistic dvs event camera streams. arXiv preprint arXiv:2006.07722, 2020. 2
[11] Daniel Gehrig, Antonio Loquercio, Konstantinos G Derpanis, and Davide Scaramuzza. End-to-end learning of representations for asynchronous event-based data. In Proceedings of the IEEE/CVF International Conference on Computer Vision, pages 5633-5643, 2019. 2
[12] Daniel Gehrig, Henri Rebecq, Guillermo Gallego, and Davide Scaramuzza. Ekit: Asynchronous photometric feature tracking using events and frames. International Journal of Computer Vision, 128(3):601-618, 2020. 2
[13] Michael D Grossberg and Shree K Nayar. Modeling the space of camera response functions. IEEE transactions on pattern analysis and machine intelligence, 26(10):1272-1282, 2004. 4
[14] Christopher G. Harris and Mike Stephens. A combined corner and edge detector. In Proc. 4th Alvey Vision Conference, Manchester, U.K., August 1988, pages 147-151, 1988.8
[15] Ralph E. Jacobson, Sidney F. Ray, and Geoffrey G. Attridge. The Manual of photography. Elsevier Ltd, 1988. 3
[16] Meiguang Jin, Givi Meishvili, and Paolo Favaro. Learning to extract a video sequence from a single motion-blurred image. In 2018 IEEE/CVF Conference on Computer Vision and Pattern Recognition (CVPR), pages 6334-6342, June 2018.6
[17] Bruce K Johnson. Photographic exposure control system and method, Jan. 3, 1984. U.S. Pat. No. 4,423,936. 1, 2
[18] Joowan Kim, Younggun Cho, and Ayoung Kim. Exposure control using bayesian optimization based on entropy weighted image gradient. In 2018 IEEE International Conference on Robotics and Automation (ICRA), pages 857-864, 2018.1
[19] Tetsuya Kuno, Hiroaki Sugiura, and Narihiro Matoba. A new automatic exposure system for digital still cameras. IEEE Transactions on Consumer Electronics, 44(1): 192-199, 1998. 2
[20] Stefan Leutenegger, Margarita Chli, and Roland Y. Siegwart. Brisk: Binary robust invariant scalable key points. In 2011 International Conference on Computer Vision, pages 2548-2555, 2011. 8
[21] Shijie Lin, Fang Xu, Xuhong Wang, Wen Yang, and Lei Yu. Efficient spatial-temporal normalization of sae representation for event camera. IEEE Robotics and Automation Letters, 5(3):4265-4272, 2020. 2
[22] Lixiong Liu, Bao Liu, Hua Huang, and Alan Conrad Bovik. No-reference image quality assessment based on spatial and spectral entropies. Signal Processing: Image Communication, 29(8):856-863, 2014. 6
[23] Li Liu, Wanli Ouyang, XiaogangWang, PaulW. Fieguth, Jie Chen, Xinwang Liu, and Matti Pietikinen. Deep learning for generic object detection: A survey. International Journal of Computer Vision, 128(2):261-318, 2020. 1
[24] Huimin Lu, Hui Zhang, Shaowu Yang, and Zhiqiang Zheng. Camera parameters auto-adjusting technique for robust robot vision. In 2010 IEEE International Conference on Robotics and Automation (ICRA), pages 1518-1523. IEEE, 2010. 1, 2
[25] Jiri Matas, Ondrej Chum, Martin Urban, and Toms Pajdla. Robust wide-baseline stereo from maximally stable extremal regions. Image and Vision Computing, 22(10):761-767, 2004. 8
[26] Anish Mittal, Anush Krishna Moorthy, and Alan Conrad Bovik. No-reference image quality assessment in the spatial domain. IEEE Transactions on Image Processing, 21(12):4695-4708, 2012. 6
[27] Mart'in Montalvo, Jos'eMGuerrero, Juan Romeo, Mar'ia Guijarro, M Jes'us, and Gonzalo Pajares. Acquisition of agronomic images with sufficient quality by automatic exposure time control and histogram matching. In International Conference on Advanced Concepts for Intelligent Vision Systems, pages 37-48. Springer, 2013. 2
[28] Masaru Muramatsu. Photometry device for a camera, Jan. 7, 1997. U.S. Pat. No. 5,592,256. 2
[29] Ant'onio JR Neves, Bernardo Cunha, Armando J Pinho, and Ivo Pinheiro. Autonomous configuration of parameters in robotic digital cameras. In Iberian Conference on Pattern Recognition and Image Analysis, pages 80-87. Springer, 2009. 1, 2
[30] Navid Nourani-Vatani and Jonathan Roberts. Automatic camera exposure control. In Proceedings of the Australasian Conference on Robotics and Automation 2007, pages 1-6. Australian Robotics and Automation Association Inc., 2007. 1, 2
[31] Yuji Nozaki and Tobi Delbruck. Temperature and parasitic photocurrent effects in dynamic vision sensors. IEEE Transactions on Electron Devices, 64(8):3239-3245, 2017. 5
[32] Edwin Olson. Apriltag: A robust and flexible visual fiducial system. In 2011 IEEE International Conference on Robotics and Automation (ICRA), pages 3400-3407. IEEE, 2011. 8
[33] Jinshan Pan, Deqing Sun, Hanspeter Pfister, and Ming-Hsuan Yang. Deblurring images via dark channel prior.

IEEE Transactions on Pattern Analysis and Machine Intelligence, 40(10):2315-2328, 2018. 6

[34] Liyuan Pan, Cedric Scheerlinck, Xin Yu, Richard Hartley, Miaomiao Liu, and Yuchao Dai. Bringing a blurry frame alive at high frame-rate with an event camera. In 2019 IEEE/CVF Conference on Computer Vision and Pattern Recognition (CVPR), pages 6813-6822, June 2019. 2,6

[35] E. Rosten and T. Drummond. Fusing points and lines for high performance tracking. In Tenth IEEE International Conference on Computer Vision (ICCV) Volume 1, volume 2, pages 1508-1515, 2005. 8

[36] Nitin Sampat, Shyam Venkataraman, Thomas Yeh, and Robert L Kremens. System implications of implementing auto-exposure on consumer digital cameras. In Sensors, Cameras, and Applications for Digital Photography, volume 3650, pages 100-107. International Society for Optics and Photonics, 1999. 2

[37] Inwook Shim, Joon-Young Lee, and In So Kweon. Autoadjusting camera exposure for outdoor robotics using gradient information. In 2014 IEEE/RSJ International Conference on Intelligent Robots and Systems, pages 1011-1017. IEEE, 2014. 2

[38] Inwook Shim, Tae-Hyun Oh, Joon-Young Lee, Jinwook Choi, Dong-Geol Choi, and In So Kweon. Gradient-based camera exposure control for outdoor mobile platforms. IEEE Transactions on Circuits and Systems for Video Technology, 29(6):1569-1583, 2018. 1, 2, 6, 7, 8

[39] N Venkatanath, D Praneeth, Maruthi Chandrasekhar Bh, Sumohana S. Channappayya, and Swarup S. Medasani. Blind image quality evaluation using perception based features. In 2015 Twenty First National Conference on Communications (NCC), pages 1-6. IEEE, 2015. 6

[40] Antoni Rosinol Vidal, Henri Rebecq, Timo Horstschaefer, and Davide Scaramuzza. Ultimate slam? combining events, images, and imu for robust visual slam in hdr and high-speed scenarios. IEEE Robotics and Automation Letters, 3(2):994-1001, 2018. 2

[41] Lin Wang, Yo-Sung Ho, Kuk-Jin Yoon, et al. Event-based high dynamic range image and very high frame rate video generation using conditional generative adversarial networks. In Proceedings of the IEEE/CVF Conference on Computer Vision and Pattern Recognition (CVPR), pages 10081-10090, 2019. 2

[42] Ziwei Wang, Yonhon Ng, Pieter van Goor, and Robert Mahony. Event camera calibration of per-pixel biased contrast threshold, 2020. 5

[43] Zihao W. Wang, Peiqi Duan, Oliver Cossairt, Aggelos Katsaggelos, Tiejun Huang, and Boxin Shi. Joint filtering of intensity images and neuromorphic events for high-resolution noise-robust imaging. In Proceedings of the IEEE/CVF Conference on Computer Vision and Pattern Recognition (CVPR), pages 1609-1619, 2020.2

[44] Zichao Zhang, Christian Forster, and Davide Scaramuzza. Active exposure control for robust visual odometry in hdr environments. In 2017 IEEE International Conference on Robotics and Automation (ICRA), pages 3894-3901. IEEE, 2017. 1, 2

While the application is explained in relation to certain embodiments, it is to be understood that various modifications thereof will become apparent to those skilled in the art upon reading the specification. Therefore, it is to be understood that the application disclosed herein is intended to cover such modifications as fall within the scope of the appended claims.

What is claimed is:

1. An event-guided auto-exposure control method for a digital camera, comprising the steps of:
- scanning a scene to create a scene radiance signal;
- linearly mapping the scene radiance signal to a sensor irradiance signal;
- generating events and images for irradiance estimation in response to the sensor irradiance signal by means of an active pixel sensor (APS) that accumulates the sensor irradiance signal during the exposure time and transform it to digital images in a non-linear manner, and a dynamic vision sensor (DVS) that works asynchronously with the APS to encode the relative change of the log of the sensor irradiance signal and generate a stream of timestamped address events; and
- utilizing an event-based irradiance estimation (I-IE) to compute a desired exposure time.

2. The event-guided auto-exposure control method of claim 1 wherein the steps of scanning and linearly mapping the scene field involve scanning a light source over the scene so that reflectance of the light from objects in the scene produce a scene radiance signal that is transformed by a lens into a sensor irradiance signal.

3. The event-guided auto-exposure control method of claim 1 wherein events and images are generated by APS and DVS in an events camera.

4. The event-guided auto-exposure control method of claim 3 wherein the events camera is a DAVIS 346 acoustic emission (AE) event camera.

5. The event-guided auto-exposure control method of claim 1 wherein the timestamped address events and each event is a 4-dimensional tuple.

6. The event-guided auto-exposure control method of claim 1 wherein the event-based irradiance estimation (I-IE) is determined by unifying both events and images by the steps of:
- formulating an estimated irradiance in the form of a reference irradiance times the average of relative irradiance, where the average of relative irradiance is achieved by nonuniformly sampling the relative irradiance of pixels at all event timestamps;
- using the estimated irradiance to compute the desired exposure time for image capturing; and
- reconstructing the intensity images using a camera response function (CRF) to form the estimated irradiance, image deblurring and high-rate frame reconstruction.

7. The event-guided auto-exposure control method of claim 6 wherein the reference irradiance is a constant.

8. The event-guided auto-exposure control method of claim 1, wherein a high dynamic range (HDR) sensing capability of DVS is leveraged to guide exposure setting for APS irradiance accumulation.

9. The event-guided auto-exposure control method of claim 6 wherein the latest unsaturated pixels are used to recover the reference irradiance, and the recovered reference irradiance is combined with the irradiance estimated from previous unsaturated pixels.

* * * * *